(12) United States Patent
Zhang et al.

(10) Patent No.: US 6,857,800 B2
(45) Date of Patent: Feb. 22, 2005

(54) METHOD FOR INPUTTING DIFFERENT CHARACTERS BY MULTI-DIRECTIONALLY PRESSING A SINGLE KEY MORE THAN ONE TIME

(75) Inventors: Wen Zhang, Shanghai (CN); Wei Shen, Shanghai (CN); Shen Zhang, Shanghai (CN)

(73) Assignee: Inventec Appliances Corp., Taipei Hsieng (TW)

(*) Notice: Subject to any disclaimer, the term of this patent is extended or adjusted under 35 U.S.C. 154(b) by 380 days.

(21) Appl. No.: 10/155,035

(22) Filed: May 28, 2002

(65) Prior Publication Data

US 2003/0223798 A1 Dec. 4, 2003

(51) Int. Cl.$^7$ .................................................. B41J 5/08
(52) U.S. Cl. ........................ 400/473; 400/477; 400/480; 200/5 A; 341/22
(58) Field of Search ................................ 400/472–474, 400/476–481, 485, 492, 100, 414, 489, 490; 341/21–22, 168; 345/168–172; 235/145 A, 145 R, 146; 200/4, 5 A–5 D, 6 A–6 D; 361/679–680; 434/227–233

(56) References Cited

U.S. PATENT DOCUMENTS 5,528,235 A * 6/1996 Lin et al. ...................... 341/22
5,796,056 A * 8/1998 Bredow et al. .............. 200/5 A
5,861,823 A * 1/1999 Strauch et al. ................. 341/22
6,157,323 A * 12/2000 Tso et al. ...................... 341/22
6,677,541 B1 * 1/2004 Rapeli .......................... 200/5 A
2002/0140679 A1 * 10/2002 Wen ............................ 345/168
2004/0135774 A1 * 7/2004 La Monica .................. 345/174

FOREIGN PATENT DOCUMENTS

WO  WO 200113392 A1 * 2/2001 ........... G06K/11/18

* cited by examiner

*Primary Examiner*—Minh Chau
(74) *Attorney, Agent, or Firm*—Bacon & Thomas, PLLC

(57) ABSTRACT

The invention is to provide a method for inputting different characters by multi-directionally pressing one single key of a portable electronic device more than one time, the key having a plurality of protuberances on an underside and a circuit board having a plurality of pads being equal in number to the protuberances and disposed correspondingly thereto, the method comprises determining the conduction periods of time by a control circuit, while one key being multi-directionally pressed a plurality of times to cause the protuberances to contact the corresponding pads at different conduction periods of time; reading a corresponding character sequentially from a built-in character database based on a longer one of the conduction periods of time; and displaying the read character. By utilizing this method, it is possible of effecting a fast input on the keypad.

8 Claims, 4 Drawing Sheets

METHOD FOR INPUTTING DIFFERENT CHARACTERS BY MULTI-DIRECTIONALLY PRESSING A SINGLE KEY MORE THAN ONE TIME

FIELD OF THE INVENTION

The present invention relates to keypad of cellular phone and more particularly to an improved method for inputting different characters by multi-directionally pressing a single key more than one time.

BACKGROUND OF THE INVENTION

Portable electronic devices such as cellular phones have been popular worldwide due to its portability and convenience as a communication device. Further, the functions of a cellular phone may incorporate features of many software packages (e.g., games, phone book, voice box, alarm, message transmission, etc.) to form a multi-functional cellular phone. Such provision of diversified services to consumers is the trend dominating the market. For example, in using phone book of cellular phone, user has to edit by manually inputting characters including alphabets and symbols in order to store frequently used telephone numbers or alphabets therein. Such stored telephone numbers or alphabets are for the facilitation of making a call later. Currently, the manual input is classified as either keypad input or touch screen input in which the former is the widely used one due to lower cost. It is also known that keypad (e.g., alphanumeric keypad) of cellular phone only comprises a small number of keys (e.g., 12 keys in one type of commercial available cellular phone). Hence, it is impossible that each of 26 English alphabets has a unique key on the keypad. In other words, a single key is configured to correspond to multiple alphabets or symbols. For example, numeric key "2" represents alphabets "ABC", key "3" represents alphabets "DEF", . . . , key "8" represents alphabets "TUV", and key "9" represents alphabets "WXYZ". Hence, user has to press a single key for more than one time for inputting a desired alphabet or symbol. For example, user may press key "2" twice for inputting alphabet "B", key "6" three times for inputting alphabets "OO", and key "5" twice for inputting alphabet "K", thus completing input of word "BOOK". In view of above, its input speed is very slow and it is inconvenient in use. This condition is even worse when user inputs many alphabets for sending via a cellular phone having capability of accessing the Internet. In addition, for example, in a commercially available cellular phone having intelligent input software, user can input one or more key alphabets of a word on keypad of the cellular phone. In response, the software can automatically search the corresponding word based on the key alphabet(s) prior to displaying the found word. This is an improvement with respect to speed as compared with above conventional technique. However, it still suffered from a disadvantage. That is, a key-in error of a word cannot be identified immediately for correction. For example, the intelligent input software is compromised when "telephone" is keyed in as "telefone".

Additionally, there is another type of commercially available cellular phone having an externally coupled standard keypad having a sufficient number of keys. In use, user can couple the external keypad to his/her cellular phone for inputting alphabets including symbols therefrom. This is an improvement with respect to the prior art intelligent input software. However, it is well known that reasons for the increasing use of cellular phone are portability, compactness, and lightweight. Hence, the provision of external keypad (i.e., increasing weight of cellular phone) may compromise the advantages of cellular phone. Thus, this is impractical. In view of above, improvement still exists in order to overcome the above drawbacks of prior art.

SUMMARY OF THE INVENTION

It is therefore an object of the present invention to provide a method for inputting different characters by multi-directionally pressing one of a plurality of keys of a key pad of a portable electronic device more than one time, each key having a plurality of protuberances on an underside and a circuit board of the portable electronic device having a plurality of pads being equal in number to the protuberances and disposed correspondingly thereto, the method comprising determining the conduction periods of time by a control circuit of the portable electronic device, while one key being multi-directionally pressed a plurality of times to cause the protuberances to contact the corresponding pads at different conduction periods of time; reading a corresponding character (e.g., alphabet or symbol) sequentially from a built-in character database by a storage device of the portable electronic device based on a longer one of the conduction periods of time; and displaying the read character on a display of the portable electronic device. By utilizing this method, it is possible of effecting a fast input on the keypad.

The above and other objects, features and advantages of the present invention will become apparent from the following detailed description taken with the accompanying drawings.

DETAILED DESCRIPTION OF THE PREFERRED EMBODIMENTS

Figure 1:
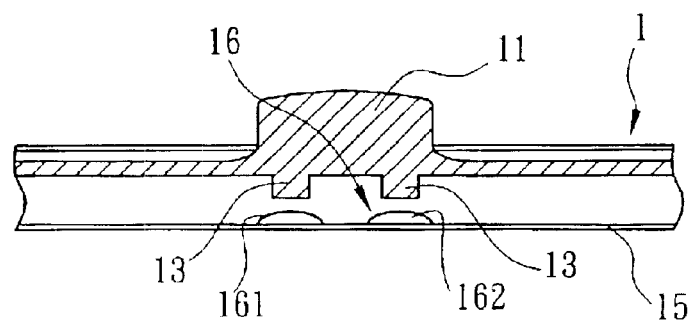
FIG. 1 is a partial cross-sectional view of a first preferred embodiment of keypad of a portable electronic device according to the invention.

The invention is directed to a method for inputting different characters by multi-directionally pressing a single key more than one time. Referring to FIG. 1, there is shown a portion of keypad of a portable electronic device (e.g., cellular phone in this embodiment) 1 for effecting the method. As shown, one of a plurality of keys 11 comprises a plurality of protuberances (two are shown) 13 on the underside thereof. A circuit board 15 of the cellular phone 1 comprises a plurality of pads 16 being equal in number to the protuberances 13 and disposed correspondingly thereto. In inputting alphabets or symbols, user can multi-directionally press key 11 more than one time to cause protuberances 13 to contact the corresponding pads 16 at different conduction periods of time. In response, a control circuit (not shown) of the cellular phone 1 determines conduction periods of time. Next, corresponding alphabet or symbol is read sequentially from a built-in character database by a storage device (not shown) of cellular phone 1 based on a longer one of the duration of conduction periods of time. Finally the alphabet or symbol is shown on a display (not shown) of the cellular phone 1. This can effect a fast alphabet or symbol input.

Figure 2:
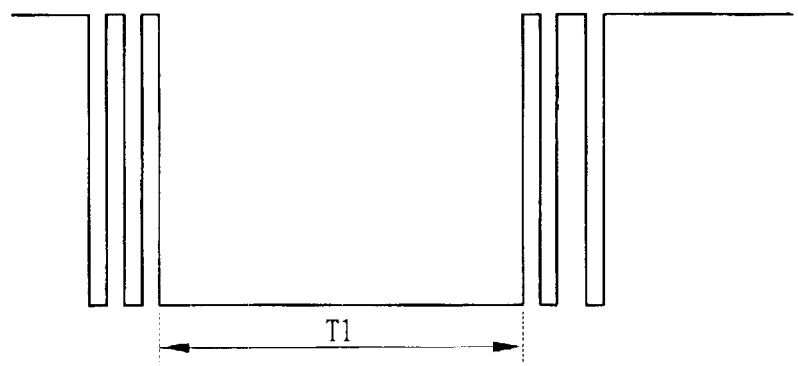
FIG. 2 is a timing diagram comparing two conduction periods of time in one key pressing.
Figure 2:
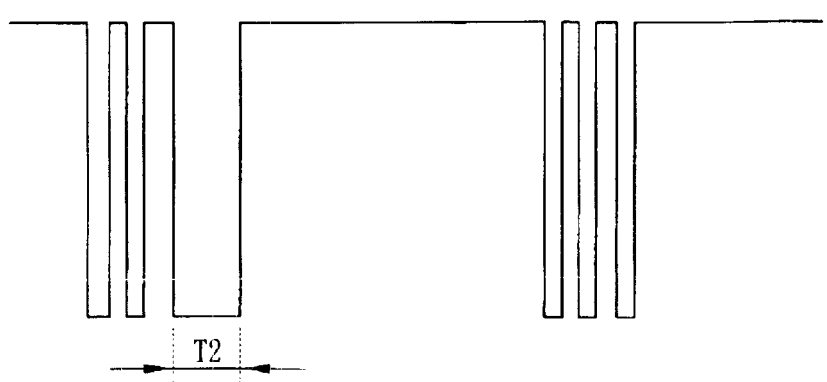

Referring to FIG. 1 again, in a first preferred embodiment of the invention there are provided a pair of protuberances 13 on the underside of key 11 and a first pad 161 and a second pad 162 on the circuit board 15 in which each pad is disposed correspondingly to a protuberance. Referring to FIG. 2 in conjunction with FIG. 1, an operation of the invention will now be described below. Right portion of key 11 will move upwardly when left portion thereof is pressed by user. In response, left protuberance 13 will contact left first pad 161 for a first duration and right protuberance 13 will contact right second pad 162 for a second duration which is shorter than the first duration. Hence, as shown, a conduction period of time (i.e., conduction time) T1 of pad 161 is longer than a conduction time T2 of pad 162.

Figure 3:
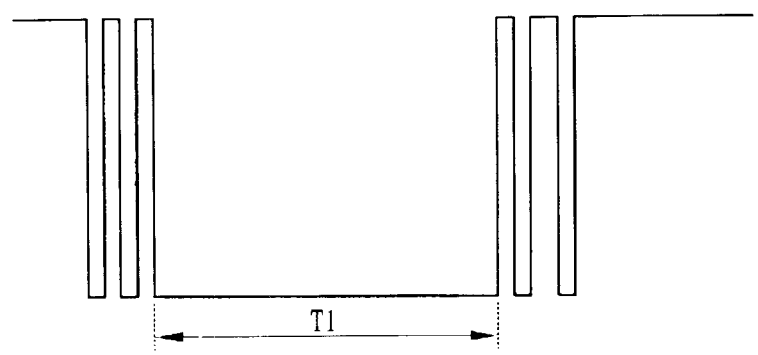
FIG. 3 is a timing diagram depicting two conduction periods of time in another key pressing having a direction different from that of FIG. 2.
Figure 3:
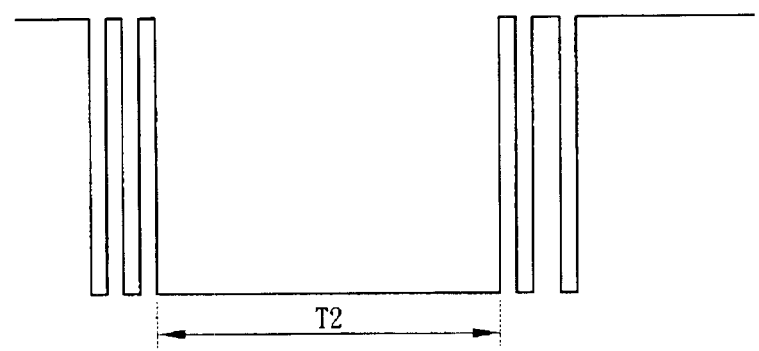

Referring to FIG. 3 in conjunction with FIG. 1, protuberances 13 of key 11 will contact pads 161 and 162 substantially at the same time when central portion of key 11 is pressed. Hence, as shown, conduction time T1 of pad 161 is very close to conduction time T2 of pad 162 in length.

Figure 4:
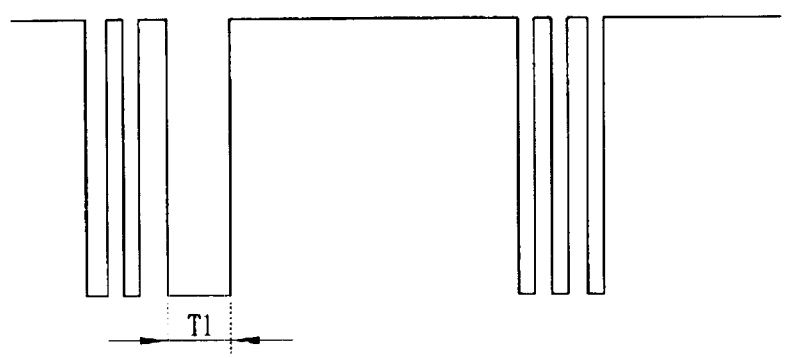
FIG. 4 is a timing diagram depicting two conduction periods of time in still another key pressing having a direction different from that of FIGS. 2 and 3.
Figure 4:
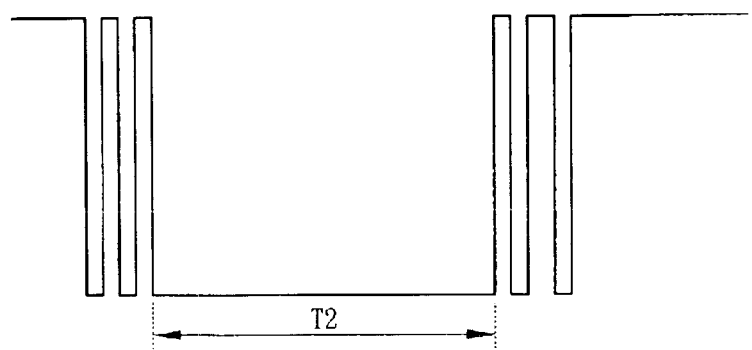

Referring to FIG. 4 in conjunction with FIG. 1, left portion of key 11 will move upwardly when right portion thereof is pressed by user. In response, left protuberance 13 will contact left first pad 161 for a first duration and right protuberance 13 will contact right second pad 162 for a second duration which is longer than the first duration. Hence, as shown, conduction time T1 of pad 161 is shorter than conduction time T2 of pad 162.

Figure 5:
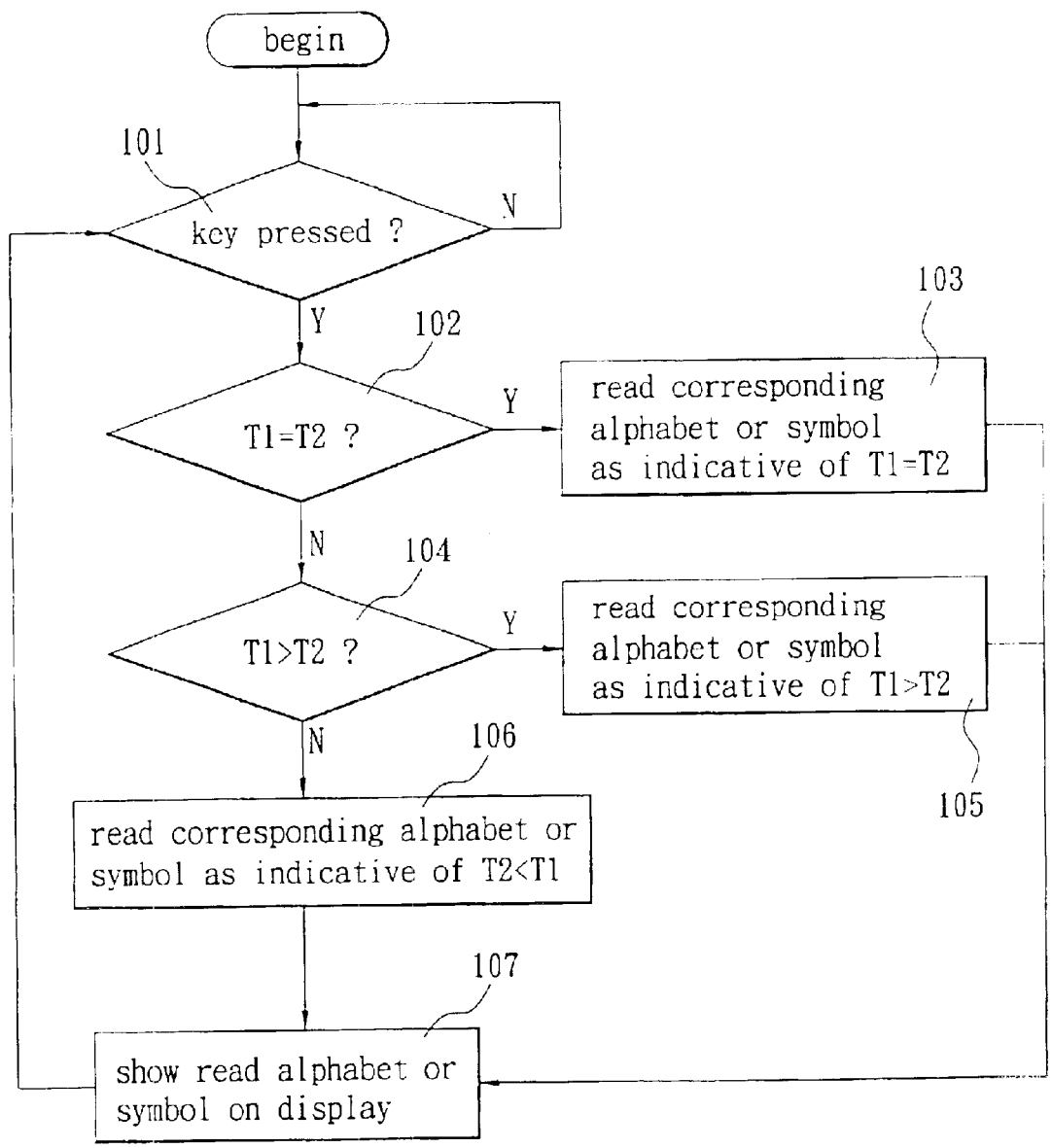
FIG. 5 is a flow chart illustrating a process according to the invention.

Referring to FIG. 5, a flow chart illustrating a process performed by the control circuit of the cellular phone 1 in response to activation. The process comprises:

In step 101, it is determined whether key 11 is pressed. If yes, the process goes to step 102. Otherwise, the process loops back to step 101.

In step 102, it is determined whether conduction time T1 of pad 161 is equal to conduction time T2 of pad 162. If yes, the process goes to step 103. Otherwise, the process jumps to step 104.

In step 103, read a corresponding alphabet or symbol from the built-in character database of storage device (not shown) of cellular phone 1 based on the determination that conduction time T1 is equal to conduction time T2. Then the process jumps to step 107.

In step 104, it is determined whether conduction time T1 of pad 161 is longer than conduction time T2 of pad 162. If yes, the process goes to step 105. Otherwise, the process jumps to step 106.

In step 105, read a corresponding alphabet or symbol from the built-in character database of storage device of cellular phone 1 based on the determination that conduction time T1 is longer than conduction time T2. Then the process jumps to step 107.

In step 106, read a corresponding alphabet or symbol from the built-in character database of storage device of cellular phone 1 based on the determination that conduction time T1 is shorter than conduction time T2. Then the process goes to step 107.

In step 107, the read corresponding alphabet or symbol is shown on the display of cellular phone 1. Next, the process loops back to step 101.

Referring to FIG. 1 again, in one configuration keys 11 are implemented as electrically activated keys. A conductor (not shown) is provided on each protuberance 13 of key 11. The conductors can be electrically coupled to first and second pads 161 and 162 for generating a conduction signal by pressing key 11. In response, the control circuit of the cellular phone 1 will process the conduction signal.

Referring to FIG. 1 again, in another configuration keys 11 are implemented as non-electrically activated keys. That is, there is no conductor on each protuberance 13 of key 11. Instead, a touch switch (or elastic means) is provided thereon. The touch switches (or elastic means) can be electrically coupled to first and second pads 161 and 162 for generating a conduction signal by pressing key 11. In response, the control circuit of the cellular phone 1 will process the conduction signal.

Figure 6:
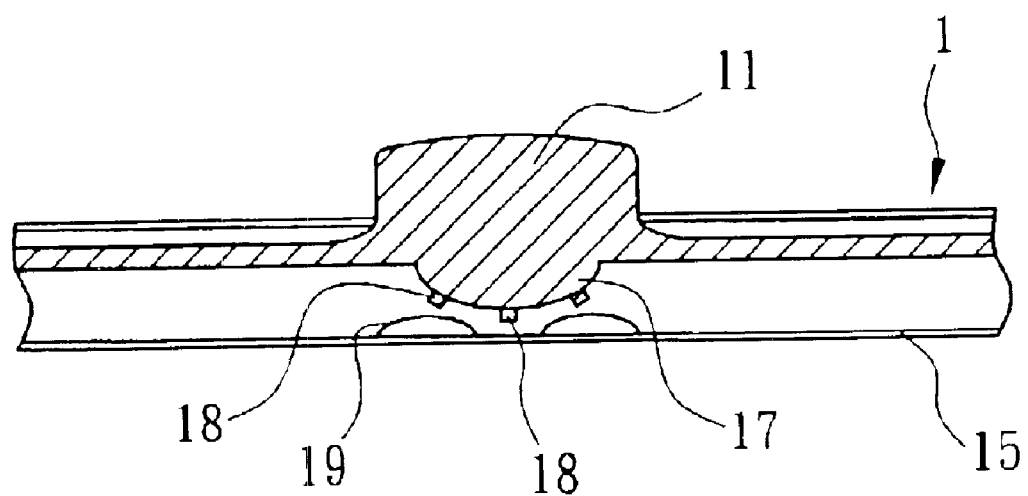
FIG. 6 is a partial cross-sectional view of a second preferred embodiment of keypad of a portable electronic device according to the invention.

Referring to FIG. 6, a partial cross-sectional view of a second preferred embodiment of keypad of the cellular phone 1 according to the invention is shown. The differences between first and second preferred embodiments are detailed below. In the second preferred embodiment, there is an arcuate elastic projection 17 on the underside of key 11. The projection 17 has three spaced protuberances 18. Also, three pads (two are shown) 19 are provided on the circuit board 15 in which each pad is disposed correspondingly to a protuberance. Hence, user can press key 11 in any one of four direction so as to form one of four contacts (i.e., first portion of key corresponding to first pad is pressed, second portion thereof corresponding to second pad is pressed, third portion thereof corresponding to third pad is pressed, and central portion thereof is pressed) among three pairs of protuberance 18 and pad 19.

In brief, the invention can greatly increase character input speed on keypad of cellular phone, thereby substantially eliminating the drawback of slow input as experienced in prior art.

While the invention has been described by means of specific embodiments, numerous modifications and variations could be made thereto by those skilled in the art without departing from the scope and spirit of the invention set forth in the claims.

What is claimed is:

1. A method for inputting different characters by multi-directionally pressing one of a plurality of keys of a keypad of a portable electronic device more than one time, each key having a pair of protuberances on an underside and a circuit board of the portable electronic device having a plurality of pads equal in number to the number of said protuberances and disposed correspondingly thereto, the method comprising:

determining the conduction periods of time by a control circuit of the portable electronic device, while one key is multi-directionally pressed a plurality of times to cause the protuberances to contact the corresponding pads at different conduction periods of time; and reading a corresponding character sequentially from a built-in character database by a storage device of the portable electronic device based on a longer one of the conduction periods of time, wherein said plurality of pads includes a first pad and a second pad, said first and second pads being disposed correspondingly to respective left and right protuberances of said pairs of protuberances such that a right portion of said one key moves upwardly when a left portion thereof is pressed and, in response, the left protuberance contacts the first pad for a first duration and the right protuberance contacts the second pad for a second duration which is shorter than the first duration, thereby generating a first conduction period of time of the first pad that is longer than a second conduction period of time of the second pad, said corresponding character being sequentially read from the built-in character database by the storage device of the portable electronic device based on the first conduction period of time.

2. The method of claim 1, wherein the protuberances of the key contact the pads substantially at the same time when a central portion of the key is pressed, thereby generating a third conduction period of time of the first pad that is substantially the same as a fourth conduction period of time of the second pad, said corresponding character being read sequentially from the built-in character database by the storage device of the portable electronic device based on one of the third and the fourth conduction periods of time.

3. The method of claim 1, wherein the left portion of the key moves upwardly when the right portion thereof is pressed and, in response, the left protuberance contacts the first pad for a third duration and the right protuberance contacts the right second pad for a fourth duration which is shorter than the third duration, thereby generating a fifth conduction period of time of the first pad that is shorter than a sixth conduction period of time of the second pad, said corresponding character being read sequentially from the built-in character database by the storage device of the portable electronic device based on the sixth conduction period of time.

4. The method of claim 1, further comprising an arcuate elastic projection on the underside of each key, each projection having three spaced protuberant members and three pad members on the circuit board wherein each pad member is disposed correspondingly to the protuberant member.

5. The method of claim 1, wherein the keys are electrically activated keys.

6. The method of claim 1, wherein the keys are non-electrically activated keys.

7. The method of claim 1, wherein the portable electronic device is a cellular phone.

8. The method of claim 1, wherein the character is a symbol.

* * * * *